(12) United States Patent
Parnell et al.

(10) Patent No.: US 7,353,933 B1
(45) Date of Patent: Apr. 8, 2008

(54) PRODUCT LOADING SYSTEM

(76) Inventors: Geoffrey Parnell, 4713 Summerlake Cir., Moseley, VA (US) 23120; Paul Boyd, 1400 Unison Dr., Midlothian, VA (US) 23113; Landon Scott, 2498 76th St. SE., Caledonia, MI (US) 49316

( * ) Notice: Subject to any disclaimer, the term of this patent is extended or adjusted under 35 U.S.C. 154(b) by 0 days.

(21) Appl. No.: 10/914,000

(22) Filed: Aug. 6, 2004

(51) Int. Cl.
*B65G 47/30* (2006.01)
(52) U.S. Cl. ................... 198/419.3; 198/460.1
(58) Field of Classification Search .......... 198/460.1, 198/419.1
See application file for complete search history.

(56) References Cited

U.S. PATENT DOCUMENTS

| | | | | | |
|---|---|---|---|---|---|
| 3,700,090 | A | * | 10/1972 | Pearson | 198/419.1 |
| 3,827,582 | A | * | 8/1974 | Lederer | 414/798.5 |
| 4,029,198 | A | * | 6/1977 | Lingl, Jr. | 198/419.1 |
| 4,041,677 | A | * | 8/1977 | Reid | 53/543 |
| 4,642,967 | A | * | 2/1987 | Culpepper | 53/398 |
| 4,732,261 | A | * | 3/1988 | Mattern et al. | 198/431 |
| 5,020,655 | A | * | 6/1991 | Cruver | 198/419.3 |
| 5,038,915 | A | * | 8/1991 | Delsanto | 198/419.3 |
| 5,070,992 | A | * | 12/1991 | Bonkowski | 198/419.1 |
| 5,097,939 | A | * | 3/1992 | Shanklin et al. | 198/419.2 |
| 5,641,072 | A | * | 6/1997 | Otake | 209/524 |
| 6,267,550 | B1 | * | 7/2001 | Morgan | 414/798.4 |
| 6,360,871 | B1 | * | 3/2002 | Meyer et al. | 198/419.1 |
| 6,843,360 | B2 | * | 1/2005 | Peterman et al. | 198/429 |

FOREIGN PATENT DOCUMENTS

JP 01162621 A * 6/1989

* cited by examiner

*Primary Examiner*—Mark A Deuble

(57) ABSTRACT

A loading system for the high speed loading of product in varying numbers comprising: an infeed conveyor having an infeed conveyor stop, a staging conveyor moving at a speed greater than the infeed conveyor and having a staging conveyor stop and a picking conveyor moving at or about the same speed as the staging conveyor and having a moveable picking conveyor stop. A photoelectric sensor or other similar counting device located in the region of the staging conveyor stop counts product as it moves from the infeed conveyor to the staging conveyor by counting the gaps between product units induced by the difference in the advancing speed of the infeed and the staging conveyors.

4 Claims, 3 Drawing Sheets

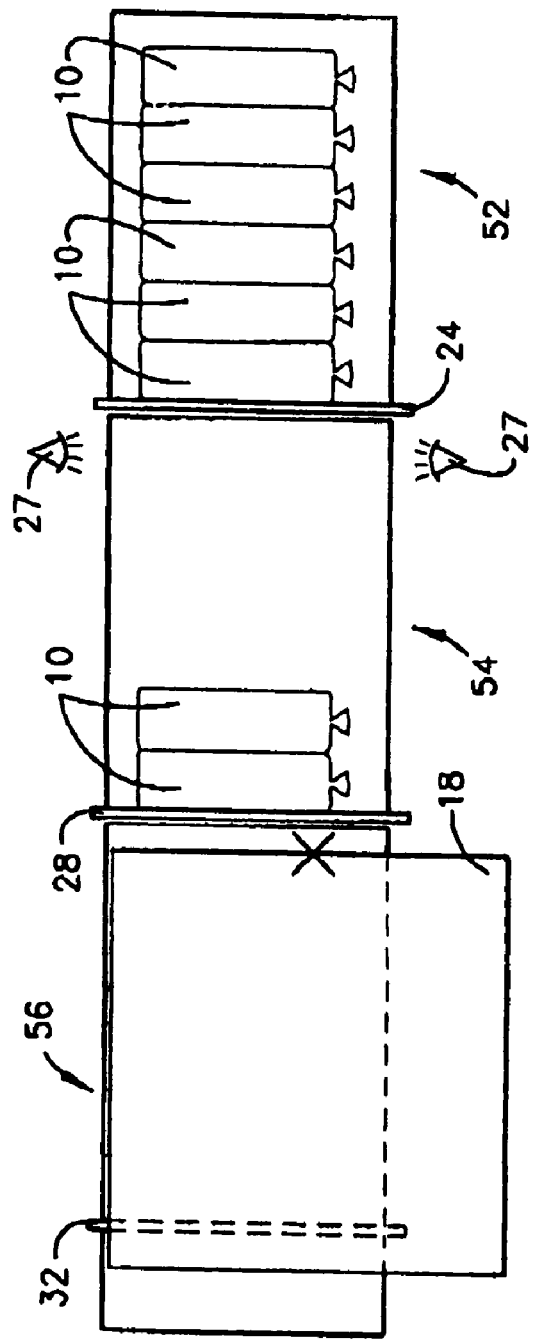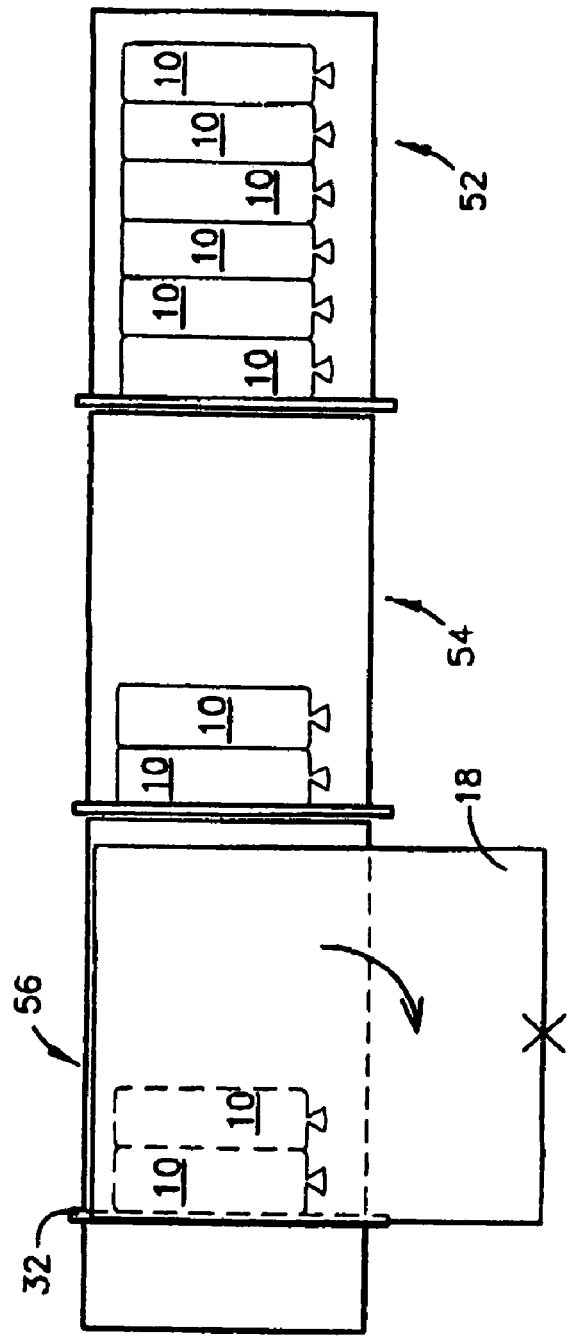
Fig. 3
Fig. 4

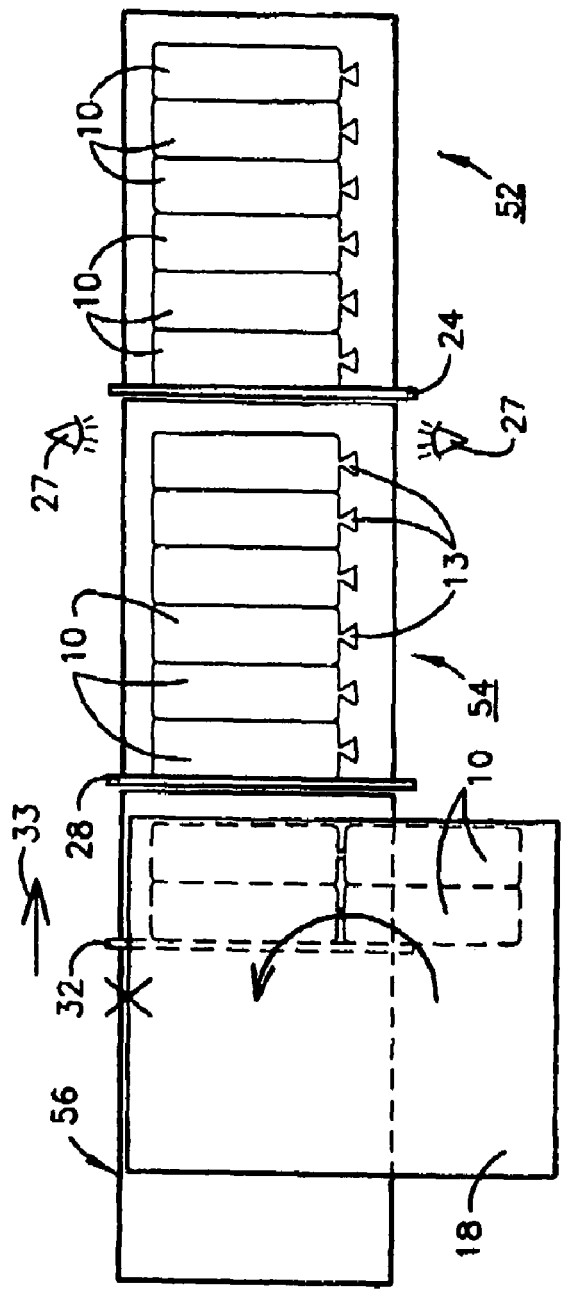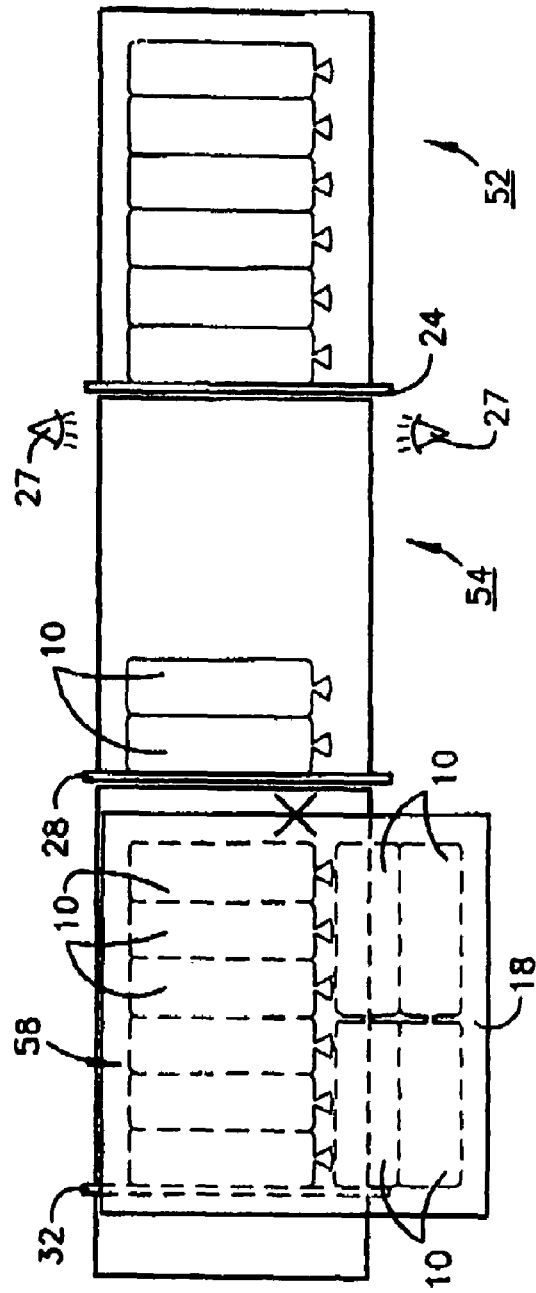
Fig. 5
Fig. 6

PRODUCT LOADING SYSTEM

FIELD OF THE INVENTION

The present invention relates to systems for feeding product into robotic packaging or similar material handling systems and more particularly to such a system that utilizes a plurality of in-line conveyor systems incorporating intermittent stops that feed, count, separate and stage the product for picking, selection, etc.

BACKGROUND OF THE INVENTION

In the staging of product for picking by any of a wide variety of robotic devices, it is highly desirable to provide a mechanism that supplies the product to the robotic picking device in a timely and often in "bundles" or "layers" comprising varying numbers of individual product elements. Such a need exists, for example, in the packaging of bread or other similar bakery products.

In the prior art, such staging was often accomplished by manual separation means or otherwise using mechanical counters and the like. While such methods and the apparatus associated with them often proved entirely acceptable for relatively low speed applications they were often woefully inadequate for supplying product in groups or bundles of varying quantity to high speed loading devices such as picking robots.

There therefore exists a continuing need for a product feeding system capable of supplying product in varying numbers to a relatively high speed load robot or other device.

OBJECT OF THE INVENTION

It is therefore an object of the present invention to provide a high speed product feeding system that is capable of delivering product in varying numbers to a high speed loading or other device.

SUMMARY OF THE INVENTION

According to the present invention, there is provided a loading system for the high speed loading of product in varying numbers comprising: an infeed conveyor having an infeed conveyor stop, a staging conveyor moving at a speed greater than the infeed conveyor and having a staging conveyor stop and a picking conveyor moving at or about the same speed as the staging conveyor and having moveable picking conveyor stop. A photoelectric sensor or other similar counting device located in the region of the staging conveyor stop counts product as it moves from the infeed conveyor to the staging conveyor by counting the gaps between product units induced by the difference in the advancing speed of the infeed and the staging conveyors.

DESCRIPTION OF THE DRAWINGS

FIGS. 3-6 depict movement of product through the loading system of the present invention.

DETAILED DESCRIPTION

Figure 1:
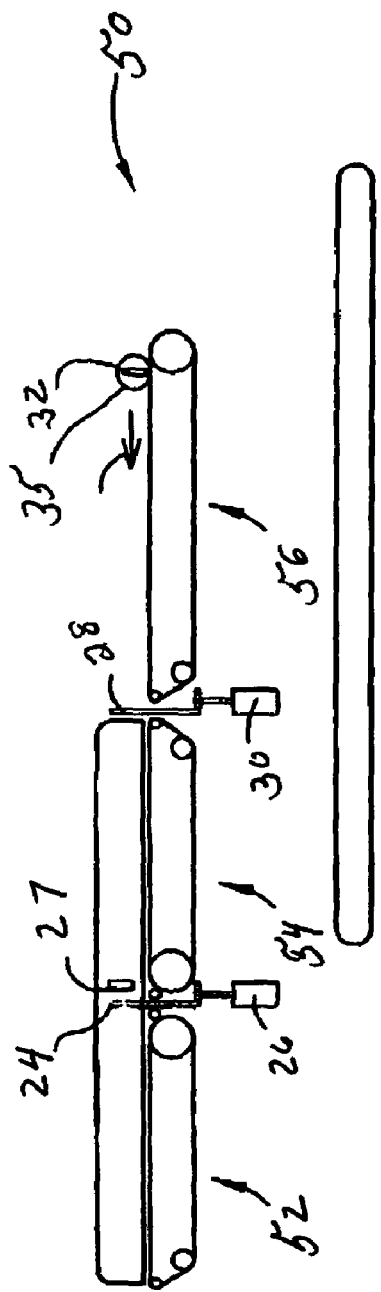
FIG. 1 is a side view of a robotic material handling system incorporating the loading system of the present invention.

Referring now to the accompanying drawings the loading system of the present invention 50 comprises an infeed conveyor 52 having a servo controlled infeed conveyor stop 24, a staging conveyor 54 having a servo controlled staging conveyor stop 28, and a pick conveyor 56 having a laterally moveable pick conveyor stop 32 controlled by servo motor 33.

Figure 2:
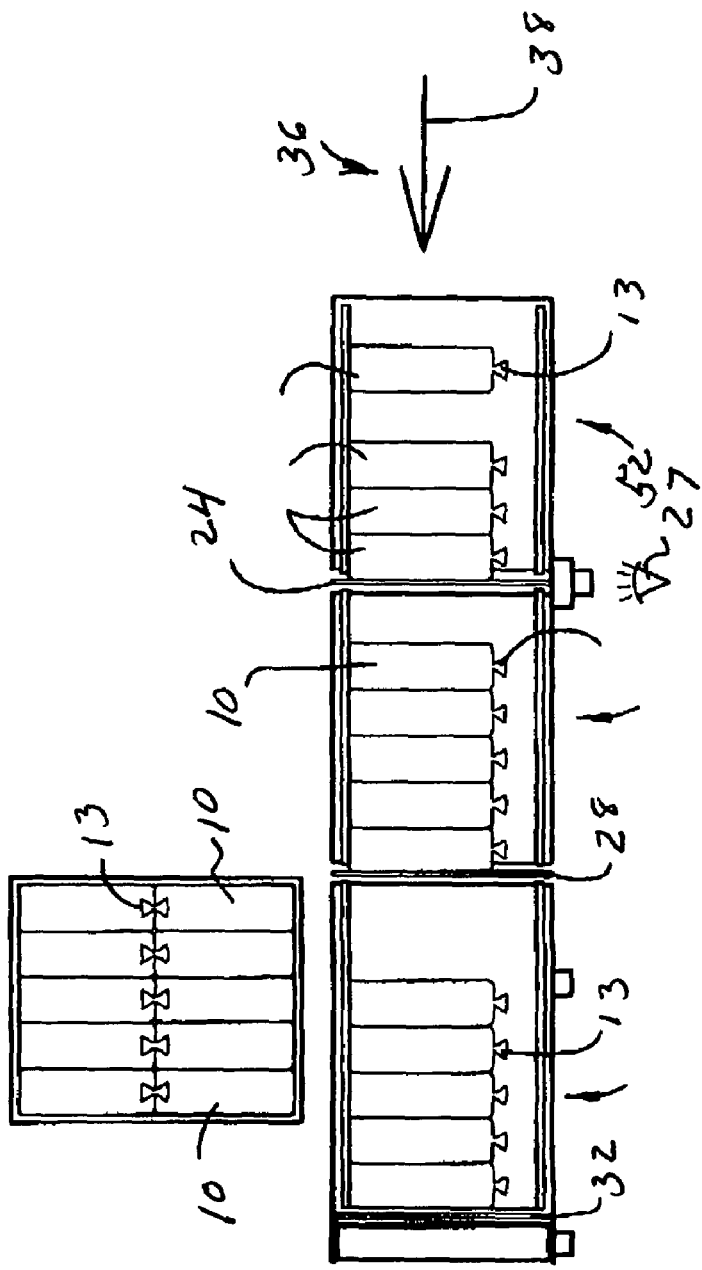
FIG. 2 is a partial schematic top plan view of the loading system of the present invention.

In the view presented in FIG. 2, it can be seen that bread loaves 10 including attached tails 13 enter infeed conveyor 52 in the direction 36 indicated by arrow 38 and are arrested or stopped by infeed stop 24. At the appropriate time as needed for loading, infeed stop 24 is drawn downward through the action of servo motor 26 allowing the appropriate number of loaves 10 that are counted by a photoelectric cell 27 or other mechanism located between infeed conveyor 52 and staging conveyor 54 to pass to staging conveyor 54 where they are stopped by staging conveyor stop 28 forming the next portion of product 10 to be advanced onto picking conveyor 56. Loaves 10 are counted between infeed conveyor 52 and staging conveyor 54 through that action of photoelectric cell 27 that senses gaps induced between the loaves as they pass form infeed conveyor 52 to staging conveyor 54 due to the difference in speed between these two elements, i.e. loaves 10 on staging conveyor 54 are moving faster than those on infeed conveyor 54 thereby giving rise to gaps between the loaves as they advance from one conveyor to the other. At the appropriate time, i.e. when picking is required, staging conveyor stop 28 driven by servo motor 30 is retracted, in the embodiment depicted herein, downward and the bundle of loaves formed on staging conveyor 54 allowed to move forward to picking conveyor 56 where they are stopped by picking conveyor stop 32. At this point, loaves 10 are ready for picking in any suitable fashion. In one possible scenario such picking would be by an end of arm tool or vacuum assisted picking device not shown.

Picking conveyor stop 32 driven by servo motor 35 is capable of lateral movement, i.e. in the direction indicated by arrow 33 so that product elements 10 that have been advanced onto picking conveyor 56 (in the Y direction) and need to be positioned for picking either: 1) proximate staging conveyor stop 28; or 2) intermediate staging conveyor stop 28 and the fully extended field of travel of picking conveyor stop 32 shown in FIGS. 1 and 2 can be accommodated. Such a situation might occur in the case of a picking device having limited field of travel or in the instance where a rotating end effector is utilized and product 10 needs to be picked in a parallel but facing position that the rotating end effector can only access if product 10 is retained in some position other than that where it is stopped when picking conveyor stop 32 is in its fully traveled position as shown in FIGS. 1 and 2.

Referring now to FIGS. 3-6 that schematically depict the operation of the material handling apparatus 50 of the present invention, as the system recognizes that there is product 10 to be packed system 50 starts. First the infeed conveyor stop 24 against which product 10 has been building on infeed conveyor 52 drops down and product 10 starts moving forward onto staging conveyor 54. Since staging conveyor 54 is moving faster, it is pulling product 10 away from infeed conveyor 52 in such a way that a gap is created between the products 10 on infeed conveyor 52 and staging conveyor 54 as they pass infeed conveyor stop 24. This gap is sensed with a photoelectric sensor 27 (see FIGS. 1 and 2). Photoelectric sensor 27 can count the number of gaps it sees and when the proper number of product 10 have passed onto staging conveyor 54, infeed conveyor stop 24 driven by servo motor 26 comes up in the gap between products 10 and stops the next product 10 from going onto staging conveyor 54. Now, the number of products 10 required for the first pick is present on staging conveyor 54 and has accumulated up against the staging conveyor stop 28 (see FIG. 3). Next, at the appropriate time, staging conveyor stop 28 drops down and passes the entire group of products 10 to pick conveyor 56. There a third servo-adjustable backstop 32 on pick conveyor 56, pick conveyor stop 32 which stops the first product in the group from going past that point. This is the point at which product 10 must be located for picking. As indicated by arrow 33 in FIG. 1, picking conveyor stop 32 can move in the Y direction as shown in FIG. 5 to allow for picking in a position adjacent to staging conveyor stop 28. In the example being presented here, a rotating end of arm tool (EOAT) 18 is waiting in the proper X, Z, and rotational position for the first pick. Rotating EOAT 18 comes down in the Z direction and picks products 10 from pick conveyor 56 using vacuum assisted suction cups 40 (see FIG. 4). After the first group product 10 has started leaving staging conveyor 54, the second group of product 10 to be picked can start entering staging conveyor 54 in the same fashion that the first product 10 group entered. The second group of product 10 is counted in the same way that the first group of product 10 was counted and released to staging conveyor 54. Once this group of product 10 is on the staging conveyor (see FIG. 3), held in the picking position by moveable picking conveyor stop 32 that has moved forward in the direction of arrow 33, rotating EOAT 18 has picked the first group of product 10 and is up and out of the way, the second group of product 10 is ready for picking on picking conveyor 56. After rotating EOAT 18 has picked the first group of product 10 it can immediately start rotating as indicated by arrow 19 and repositioning its X position to be ready for the next group of product 10 that has now been moved to picking conveyor 56 as just described. The servo controlled staging conveyor backstop 28 (Y-axis stop) can also immediately rise for its stopping position preparatory to building the next bundle to be picked. When the second group of product 10 is in the proper Y position on pick conveyor 56, and once end effector 18 has adjusted to the proper W and X position for the second group of product 10, rotating EOAT 18 is lowered in the Z direction such that it picks the second group of product 10 (see FIG. 16). This process is repeated until the entire complex pattern of products (the layer or bundle) is assembled on rotating EOAT 18 as shown in FIG. 6.

While the operation of the various stops described hereinabove in connection with the accompanying drawings as being driven by servo motors, it will be readily understood by the skilled artisan that such devices could equally well be driven by pneumatic, hydraulic, electric or other suitable means, There has thus been described a high speed loading system that is capable of moving counted quantities of product from an infeed station or location to a picking location.

What is claimed is:

1. A loading system for the high speed loading of product in varying numbers comprising:
   A) an infeed conveyor having a top surface, an input end and an output end and a vertically moveable transverse infeed conveyor stop located at the infeed conveyor output end and extending laterally and continuously across the full width of said infeed conveyor;
   B) a staging conveyor moving at a speed greater than the infeed conveyor and having an input end and an output end and a vertically moveable transverse staging conveyor stop located at the staging conveyor output end extending laterally and continuously across the full width of said staging conveyor;
   C) a picking conveyor moving at a slower speed than the staging conveyor and having an input end and an output end defining a length for the picking conveyor and a top surface; and
   D) a picking conveyor stop extending across the full width of said picking conveyor adjustable between the input end and the output end for stopping predetermined quantities of objects to be picked from the picking conveyor;
   E) a counting device located in the region of the infeed conveyor stop that counts product as it moves from the infeed conveyor to the staging conveyor by counting gaps between product units induced by the difference in the advancing speed of the infeed and the staging conveyors, all of said infeed, staging and picking conveyor top surfaces being in fixed horizontal alignment to permit transfer of product moving on said infeed, staging and picking conveyors to advance therebetween.

2. The loading system of claim 1 wherein said counting device is a photoelectric sensor.

3. The loading system of claim 1 wherein said transverse infeed conveyor stop and said transverse staging conveyor stop move upward to arrest the advancement of product advancing thereon and downward to permit the passage of product advancing on the infeed and staging conveyors.

4. The loading system of claim 1 wherein said picking conveyor stop is controllably moveable forward and backward in the direction of conveyor movement to arrest the advancement of product advancing thereon at any desired location along the Y direction of the picking conveyor—so that picking thereof may occur from said desired location.

* * * * *